United States Patent [19]

Kanak et al.

[11] 4,305,735
[45] Dec. 15, 1981

[54] METHOD FOR IMPROVING DISSOLUTION EFFICIENCY IN GAS-ABSORPTION AND LIQUID EXTRACTION PROCESSES

[75] Inventors: Brant E. Kanak, Knoxville; Michael J. Stephenson, Oak Ridge, both of Tenn.

[73] Assignee: The United States of America as represented by the United States Department of Energy, Washington, D.C.

[21] Appl. No.: 111,495

[22] Filed: Jan. 11, 1980

[51] Int. Cl.³ .............................................. B01D 53/16
[52] U.S. Cl. .......................................... 55/37; 55/48; 55/51; 55/66; 210/634
[58] Field of Search ............... 55/37, 44, 48, 51, 66; 210/21; 422/256

[56] References Cited

U.S. PATENT DOCUMENTS

| | | | |
|---|---|---|---|
| Re. 21,239 | 10/1939 | Walker et al. | 55/51 X |
| 2,180,496 | 11/1939 | Balcar | 55/51 X |
| 2,299,426 | 10/1942 | Rosebaugh | 422/256 X |
| 2,807,654 | 9/1957 | Grimmett et al. | 210/21 X |
| 3,225,519 | 12/1965 | Stotler | 55/48 |
| 3,394,189 | 7/1968 | West et al. | 210/21 X |
| 3,762,133 | 10/1973 | Merriman et al. | 55/48 X |
| 3,785,120 | 1/1974 | Merriman et al. | 55/48 X |
| 4,129,425 | 12/1978 | Stephenson et al. | 55/48 X |

Primary Examiner—Robert H. Spitzer
Attorney, Agent, or Firm—Fred O. Lewis; Stephen D. Hamel; Richard G. Besha

[57] ABSTRACT

This invention is a method for improving dissolution efficiency in processes in which a feed fluid is introduced to a zone where it is contacted with a liquid solvent for preferentially removing a component of the feed and where part of the solvent so contacted undergoes transfer into the feed fluid to saturate the same. It has been found that such transfer significantly impairs dissolution efficiency. In accordance with the invention, an amount of the above-mentioned solvent is added to the feed fluid being introduced to the contact zone, the solvent being added in an amount sufficient to effect reduction or elimination of the above-mentioned transfer. Preferably, the solvent is added to the feed fluid in an amount saturating or supersaturating the feed fluid under the conditions prevailing in the contact zone.

11 Claims, 7 Drawing Figures

METHOD FOR IMPROVING DISSOLUTION EFFICIENCY IN GAS-ABSORPTION AND LIQUID EXTRACTION PROCESSES

The U.S. Government has rights in this invention pursuant to Contract No. W-7405-ENG-26 between the U.S. Department of Energy and Union Carbide Corporation.

BACKGROUND OF THE INVENTION

1. Field of the Invention

This invention relates broadly to processes for effecting mass transfer between fluids. More particularly, it relates to a method for promoting mass transfer in gas-absorption and liquid-extraction processes, as well as other processes involving preferential dissolution of a gas or liquid in a fluid solvent.

2. Related Art

Processes involving the preferential dissolution of a gas or liquid in a solvent are of great importance to industry. For example, gas-absorption and liquid-extraction processes are used extensively in the purification of raw materials and the separation of products from byproducts. Such processes commonly are conducted in columns for countercurrently contacting immiscible fluid phases. For instance, U.S. Pat. No. 3,762,133 (issued on Oct. 2, 1973, to Merriman, Pashley, Stephenson, and Dunthorn) describes a process in which a multicomponent feed gas is introduced continuously to the lower end of an absorber column in which the feed gas is contacted with a down-flowing stream of a liquid fluorocarbon for preferentially absorbing a gaseous component desired as the product. U.S. Pat. No. 3,785,120 (issued to the same inventors on Jan. 15, 1974) describes a process in which a multicomponent feed gas is similarly contacted to effect preferential absorption of various contaminants from the feed gas. To maintain a closed system, both of the patented processes typically operate with continuous gas recycle. That is, during further processing of the liquid solvent outflow from the absorber, a mixture of desorbed gases containing some solvent vapor is evolved; this mixture is recycled continuously to the feed being introduced to the absorber column.

U.S. Pat. No. 4,129,425, issued to Stephenson and Eby on Dec. 12, 1978, describes an improved gas-absorption process in which a feed gas is countercurrently contacted with a liquid fluorocarbon in a single "combination" column containing an absorption zone, an intermediate contacting zone, and a stripping zone.

Gas absorption, liquid extraction, and related processes are described generally in the following reference: Treybal, R. E. *Mass Transfer Operations.* New York: McGraw-Hill Book Co. (1968).

Although mass-transfer operations involving the use of a solvent to preferentially dissolve a component of a fluid mixture are relatively efficient, the development of a method for increasing dissolution efficiency by even a small amount would be of considerable value, especially if the method can be incorporated in already installed process systems.

3. Objects of the Invention

Accordingly, it is an object of this invention to provide a method for improving dissolution efficiency in mass-transfer processes involving the preferential dissolution of one fluid in another.

It is another object to provide a method for improving absorption efficiency in gas-absorption processes and extraction efficiency in liquid-extraction processes.

It is another object to provide a method for improving a process wherein a first fluid phase containing a given component is contacted with a second fluid phase for preferentially removing that component, the method being designed to enhance transfer of said component into the second phase.

It is another object to provide a relatively simple method for improving dissolution efficiency in proposed or existing systems for carrying out gas-absorption and liquid-extraction operations.

Other objects, advantages, and novel features will become evident from the description and figures.

SUMMARY OF THE INVENTION

The invention may be summarized as a method for increasing dissolution efficiency in a process wherein (a) a feed fluid including at least a first component and a second component is introduced to a zone where the fluid is contacted with a liquid solvent for preferentially dissolving one of the components and (b) part of the liquid solvent transfers into the feed fluid to effect saturation of the same. Such transfer impairs dissolution efficiency. In accordance with the invention, a sufficient amount of the above-mentioned solvent is incorporated in the feed fluid to restrict such transfer.

DESCRIPTION OF THE PREFERRED EMBODIMENT

Our invention is an offshoot of an experiment conducted to determine the distribution profile of gaseous krypton along the length of a small krypton-absorption column. In accordance with the process disclosed in above-referenced U.S. Pat. No. 3,762,133, a feed gas consisting of fixed amounts of nitrogen and krypton (stable krypton containing a constant proportion of radioactive $^{85}Kr$) was introduced continuously to the bottom of the column. A stream of liquid fluorocarbon solvent ($CCl_2F_2$—dichlorodifluoromethane) was passed downwardly through the column to selectively absorb krypton from the feed gas. The closed system was operated with recycle to the feed gas of desorbed gases containing some solvent vapor. With the column in normal operation, a detector responsive to gamma radiation from the $^{85}Kr$ was moved vertically alongside the column to determine the krypton concentrations at the feed-gas inlet and at various points thereabove. (In previous runs, such a scan had not been made and although some gas samples had been withdrawn from intermediate points in the column, there was no reason to withdraw samples from the region near the feed-gas inlet.) The resulting data were used to construct a krypton-concentration profile (FIG. 1) for the column. That is, the data were used to correlate krypton molar ratio, (i.e., moles Kr at a particular point of measurement/moles Kr at the feed point for the gas) with distance from the feed point for the gas.

Figure 1:
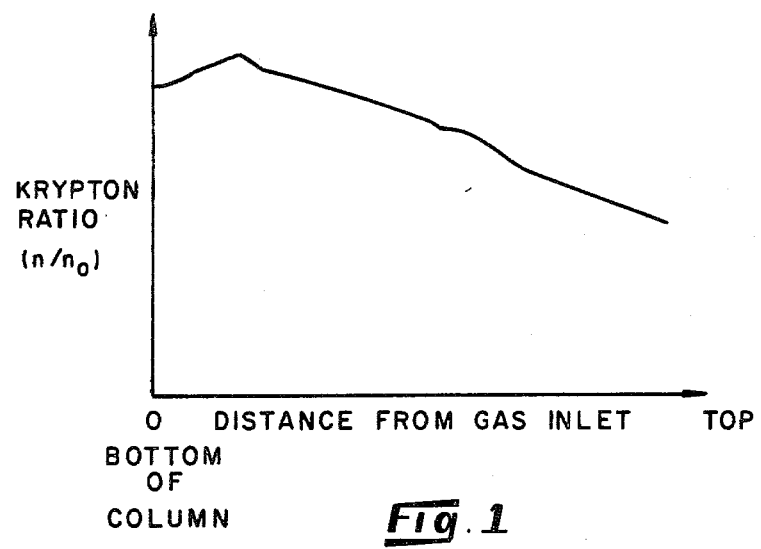
FIG. 1 is an illustration of a concentration profile for gaseous krypton in an absorption column used in a conventional krypton-absorption process, the profile exhibiting a peak value for the krypton molar ratio in a region somewhat above the feed-gas inlet for the column.

As illustrated in FIG. 1, the krypton profile did not decline continuously from the gas inlet to the top of the column. Instead, it exhibited a peak, or hump, in a zone just above the inlet for the gas. Subsequent investigation established that the hump was the result of an unexpected "negative-absorption" effect caused by vaporization of the liquid solvent into the feed gas in the zone where they were first contacted. (That zone is referred to herein as the "contact zone.") We have found that such vaporization adversely affects absorption in the contact zone, decreasing or even eliminating the molecular diffusion of gaseous krypton into the liquid solvent. As a result, a segment of the absorber just above the gas inlet is rendered partly or totally ineffective. In the relatively short column referred to above, the resulting inefficiency was equivalent to a loss of the initial two-to-three-foot section of the column. In production-scale columns, the resulting inefficiency can be much larger.

Still referring to the above-mentioned solvent-vaporization effect, we have found that the liquid solvent vaporizes into the feed gas in an amount sufficient to saturate the gas under the conditions obtained in the above-mentioned contact zone. That is, such vaporization takes place in instances where the feed gas contains no vaporized solvent or an amount of such vapor insufficient to saturate the gas under contact-zone conditions. Describing the phenomenon somewhat differently, vaporization of the liquid solvent occurs if, in the contact zone, the vapor pressure of the liquid solvent exceeds the vapor pressure of the solvent in the feed gas.

Referring to gas-absorption processes subject to the solvent-vaporization effect referred to above, we have found that the effect can be reduced or eliminated by adding vapor of the process solvent to the feed gas being contacted with the liquid solvent, or absorbent. Preferably, the vapor is added in an amount at least sufficient to saturate the gas under the conditions obtained in the zone where initial contact of the gas and the process solvent (absorbent) is effected. That is, the vapor is admitted in an amount saturating or supersaturating the feed gas. The solvent vapor may be derived from any suitable source, such as a storage cylinder; if convenient, it may be derived from the process system associated with the absorption operation. The solvent may be injected in the feed gas in any suitable form— e.g., as undiluted vapor, as part of a gaseous mixture, or as a liquid to be vaporized after injection. The solvent vapor may be introduced to the feed gas at any suitable point in the system, such as a point in the line conveying the feed gas to the absorber; if desired, it may be separately introduced to the contact zone in a manner ensuring that the vapor is in the feed gas when the latter is first contacted with the liquid solvent. The beneficial effect of the solvent-vapor addition may be realized, for example, in conventional gas-absorption processes in which the feed gas normally contains no vapor or in which the feed gas contains solvent vapor in an amount below the saturation value under contact-zone conditions.

Referring now to liquid-extraction processes, an effect analogous to the above-discussed solvent-vaporization effect occurs under certain conditions, rendering a segment of the extraction column partially or totally ineffective. That is, when a liquid stream not saturated with the extractant is introduced to the contact zone, the extractant in the zone saturates the incoming feed stream, restricting or preventing extraction of the soluble species. In accordance with our invention this effect can be diminished or eliminated by increasing the amount of extractant in the feed stream to be contacted with liquid extractant in the contact zone. Preferably, sufficient extractant is added to at least saturate the feed stream. Preferably, the extractant is added as a liquid.

Our invention is generally applicable to mass-transfer processes subject to the above-mentioned inefficiencies attending solvent transfer into feed gases or feed liquids in the contact zone. For brevity, however, it will be illustrated in detail as utilized in particular gas-absorption process. Where the term "saturation value" is used, it will be understood to mean the value consistent with contact zone conditions.

EXAMPLE 1 (Runs 529A1 and 529P1)

An experiment was conducted to demonstrate the beneficial effect of the invention when incorporated in a continuous krypton-absorption operation in which a feed gas (components: nitrogen and krypton containing a fixed proportion of $^{85}Kr$) was introduced to the bottom of a column and countercurrently contacted with a stream of liquid $CCl_2F_2$. First, a conventional krypton-absorption run was conducted in accordance with above-referenced U.S. Pat. No. 3,762,133. Then another run was conducted in the same system and under virtually the same conditions but utilizing solvent-vapor injection in accordance with the invention. The process system used in these experiments is shown schematically in FIG. 2. The system consisted of conventional components designated by numbers in the figure.

Figure 2:
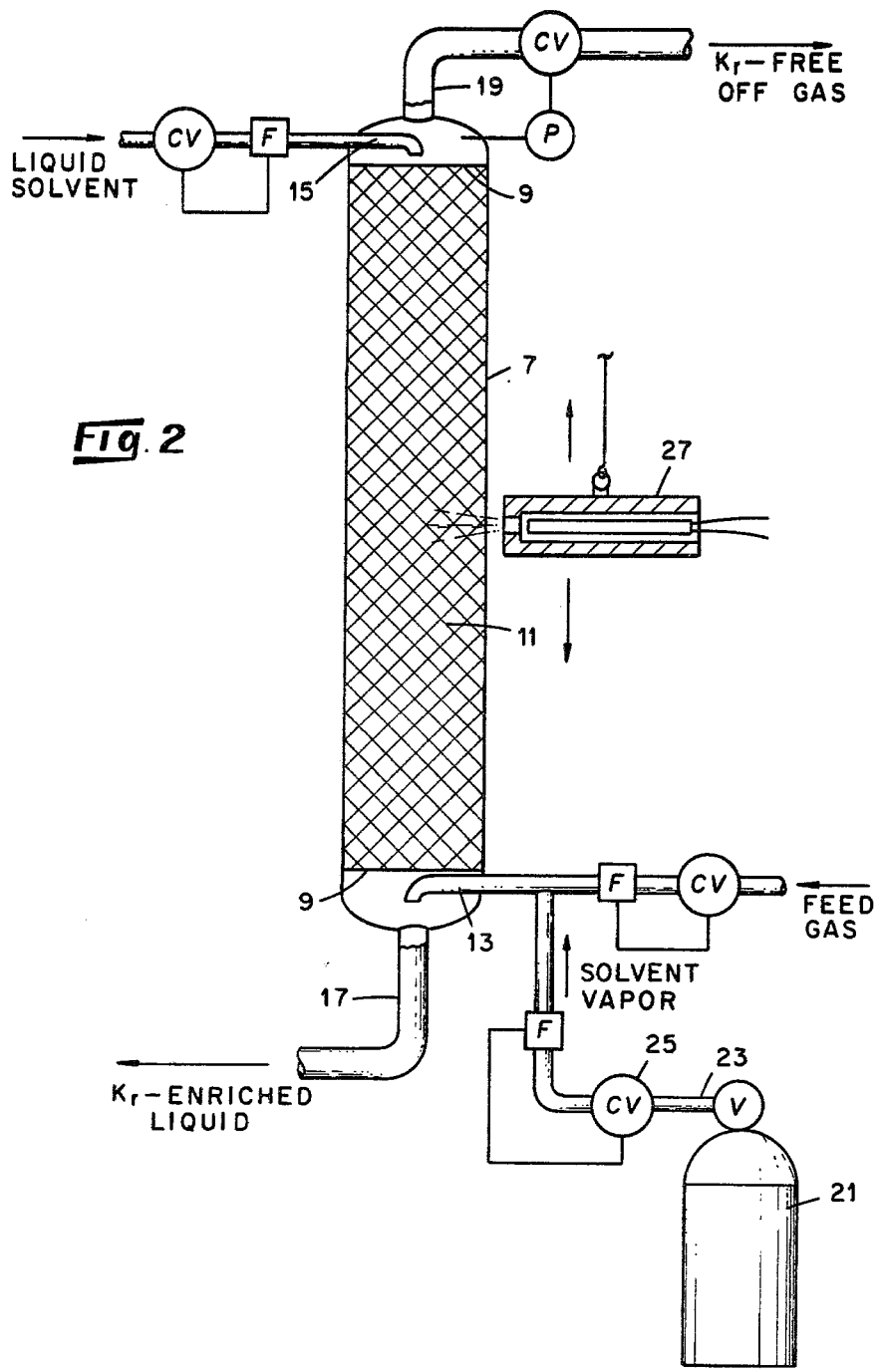
FIG. 2 is a schematic diagram of a krypton-absorption system provided with means for selectively introducing vapor of the process solvent into the feed gas.

Referring to FIG. 2, the absorption column 7 was constructed of stainless steel. The column contained screens 9 for confining packing wire-mesh therebetween and was provided with a feed gas inlet 13 positioned below the packing and a liquid solvent inlet 15 positioned above the packing. The column also was provided with a bottom outlet 17 for liquid solvent containing absorbed gaseous krypton and a top outlet 19 for gas depleted of krypton. The distance from the feed-gas inlet 13 and the top of the column was approximately 50".

Still referring to FIG. 2, the system included an arrangement for selectively feeding $CCl_2F_2$ vapor into the feed gas being introduced to the column. This arrangement comprised a storage cylinder 21 for liquid $CCl_2F_2$, having a valved vapor outlet 23, which was connected to the feed-gas input line. As shown, the vapor-outlet line included a transmitter F for generating a signal proportional to the flow of vapor from the cylinder; this signal was impressed on an automatic control valve 25 for maintaining the vapor flow rate at a selected value. As shown, similar combinations of control valves CV and transmitters F were provided to maintain various flow rates at selected values. Similarly, a pressure transmitter P and control valve CV were used to maintain a selected pressure in the column. A lead-shielded gamma-radiation detector 27 responsive to krypton-85 was mounted alongside the column for movement up and down the same.

The following is a summary of the process parameters for the run conducted in conventional fashion.

Figure 3:
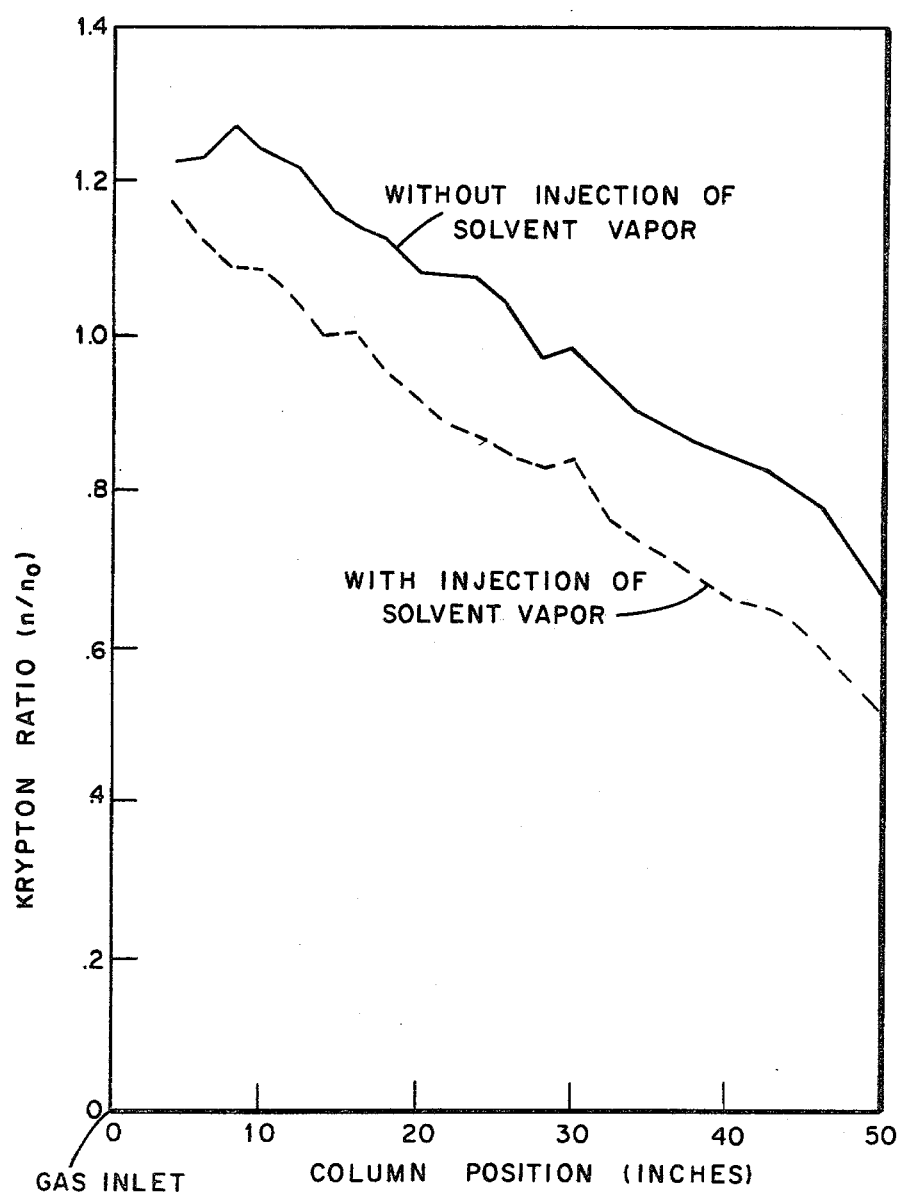
FIG. 3 is a graph comparing krypton-concentration profiles obtained in the above-mentioned system when operated (a) in conventional fashion and (b) as modified by utilizing the invention.

Feed gas composition: $N_2$, approximately 100%; Kr and $^{85}$Kr, approximately 0.3%
Column temperature, approximately $-10°$ F.
Column pressure, approximately 114 psia
Gas feed rate: 9 scfm
Liquid feed rate: 0.75 gpm Referring to FIG. 3, the data points represented by the solid line define the krypton ratio (n/no) profile for the run conducted in conventional fashion.

In the run conducted in accordance with the invention, solvent vapor derived from the cylinder was fed into the feed gas at a rate of 0.12 moles/hr. As a result, the solvent-vapor content of the gas input to the absorber was >100% of the saturation value. The data points shown in dashed lines in FIG. 3 define the resulting n/no profile. As shown, solvent-vapor injection appreciably decreased the hump (negative-absorption effect) in the region just above the gas inlet and decreased the n/no ratio throughout the length of the column. As compared with the conventional run, the improvement in absorption efficiency was about 25%.

Figure 4:
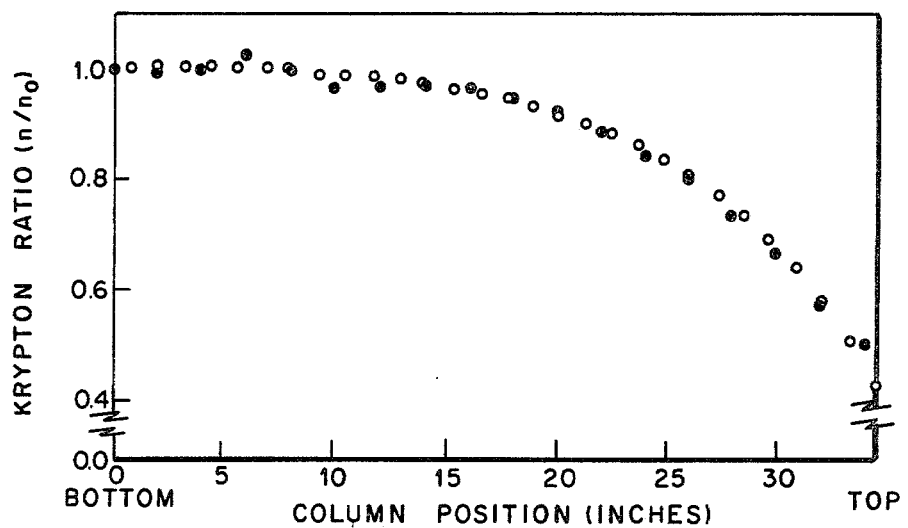
FIG. 4 is a graph comparing a krypton-concentration profile derived from a conventional krypton-absorption run and a corresponding profile predicted for the run on the basis of a mathematical model, FIG. 5 compares three krypton-concentration profiles obtained when the above-mentioned model was used to determine the performance of a krypton-absorption column operated in three modes—(a) with no solvent in the feed gas, (b) with the feed gas containing solvent in the amount of 50% of the saturation value, and (c) with the feed gas containing solvent in the amount of 100% of the saturation value, FIG. 6 compares the nitrogen-plus-solvent-flux profiles for the three modes of operation referred to just above, and FIG. 7 compares the krypton-flux profiles for the same three modes of operation.

A mathematical model was devised to predict the performance of a conventional krypton-absorption column operated in standard fashion—i.e., without solvent-vapor injection in the feed gas. The column had a diameter of 3″, and its gas inlet was situated 35″ below its top end. The composition of the feed gas was as follows: $N_2$—81.3%; $CCl_2F_2$—8.7%; Kr and $^{85}$Kr—trace. The gas feed was 1.426 lb-moles/hr., and the feed rate for the liquid solvent ($CCl_2F_2$) was 6.24 lb-moles/hr. The initial-contact zone for the feed gas and solvent was at a temperature of $-14°$ F. and a pressure of 106 psig. A krypton-concentration profile of the kind described above was plotted with data obtained in the run. FIG. 4 compares the experimentally derived profile (shaded circles) with the profile (unshaded circles) calculated with the model. As shown there was very close agreement between the experimentally derived values and the calculated values. Similar comparisons verified that the column performance could be accurately predicted with the model.

EXAMPLE 2

Figure 5:
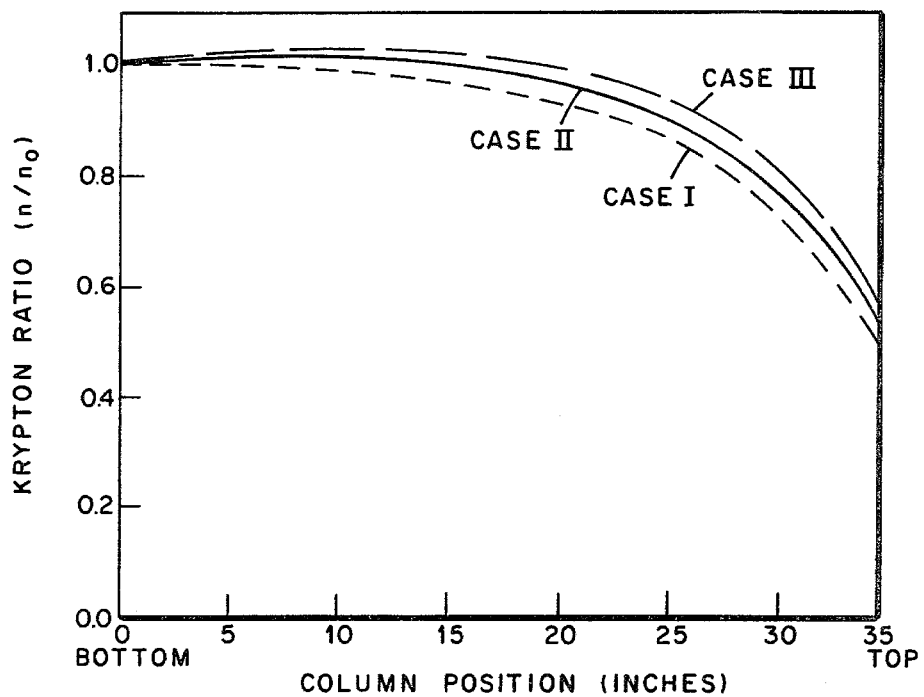

The model was used to determine the performance of a krypton-absorption column (diameter, 3″) in which liquid $CCl_2F_2$ was contacted countercurrently with a feed gas consisting of nitrogen, krypton, and, in some instances, $CCl_2F_2$ vapor. Three operating modes were considered. The process parameters were virtually identical for the three modes, with the exception that the feed gases differed as follows with respected solvent-vapor content: Case I, 100% of the saturation value; Case II, 50% of the saturation value, Case III, no solvent vapor. The calculated krypton profiles for the cases are shown in FIG. 5. As shown, in Case II (50% saturated) and Case III (no solvent injection), the profiles exhibit a krypton buildup in the part of the column adjoining the gas inlet, whereas in Case I (saturated) the krypton profile declines continuously from the gas inlet to the top of the column. In Case III (no injection), about 19 inches of the 35″-column are required to return the krypton molar ratio to the value obtained at the gas inlet. The calculated loss in column absorption efficiency for Case III is 13%. Clearly, Case I achieves the most efficient use of the column.

Figure 6:
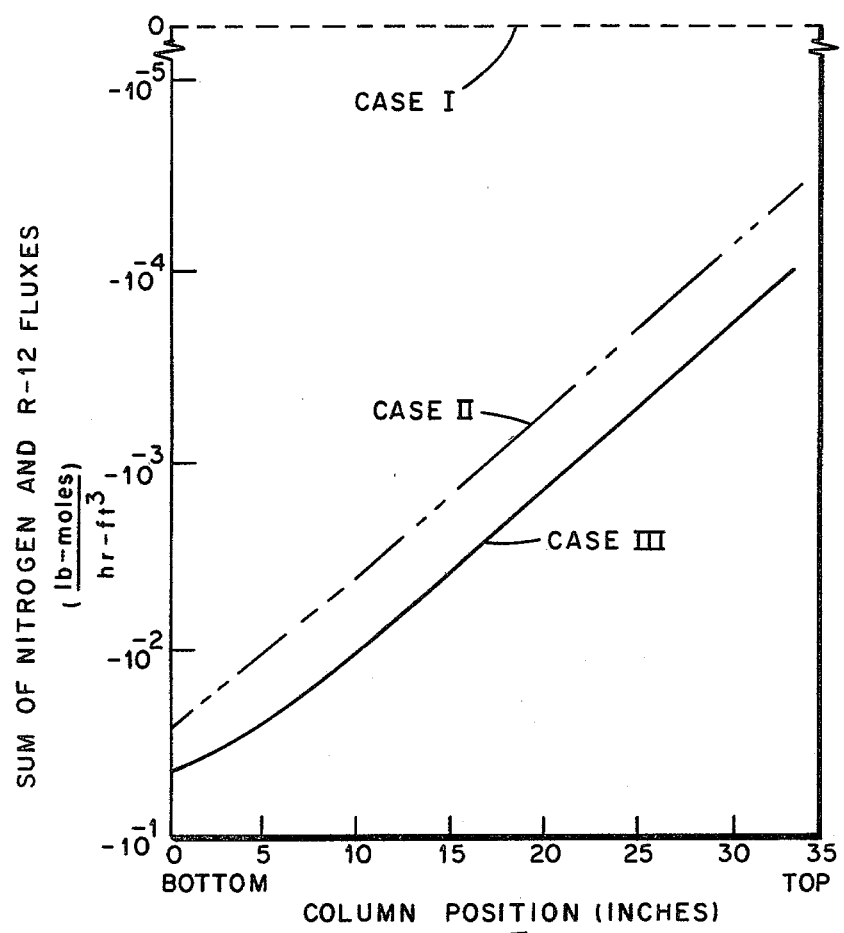
Figure 7:
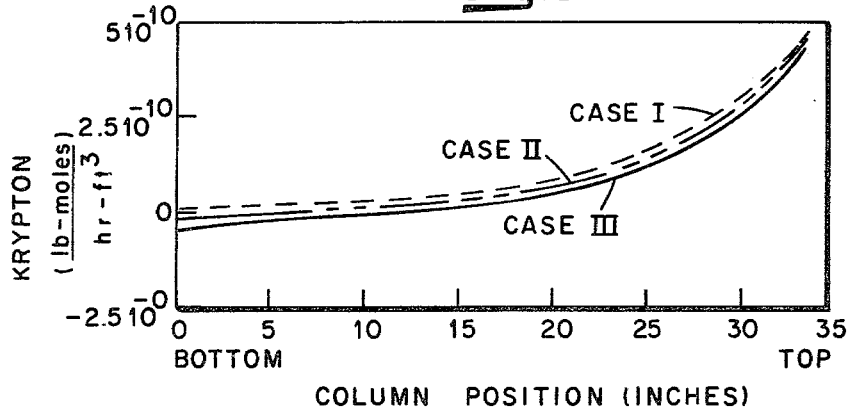

FIG. 6 compares the nitrogen-plus $CCl_2F_2$ flux profiles for above-mentioned cases I, II, and III, whereas FIG. 7 compares the krypton-flux profiles for the same. In cases II and III—where the feed gas is not saturated with solvent vapor—an overall driving force exists for the transfer of the solvent from the liquid phase into the gas phase. This movement of solvent is in a direction opposite to that in which krypton would be expected to move on the basis of its concentration gradient. The net effect of these opposed driving forces is to decrease or reverse the movement of krypton, as shown in FIG. 7 for cases II and III. In Case I, however, the feed gas is saturated with solvent-vapor and thus the movement of krypton is dependent only on its own concentration gradient. As a result, in Case I the krypton flux profile (FIG. 7) is always positive and declines continuously from the gas inlet to the top of the column.

With respect to offsetting the solvent-vaporization effect, supersaturation of the feed gas provides some improvement over saturation. Supersaturation may be desirable in some instances because condensation of the excess solvent vapor in the contact zone effects some internal heating.

The foregoing description of a preferred embodiment of the invention has been presented for purposes of illustration and description. It is not intended to be exhaustive or to limit the invention to the precise form disclosed, and, as indicated above, obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto, where references to saturation of the feed gas and amounts required to saturate the same are to be understood as meaning under the conditions obtained in the zone recited in the claims.

What is claimed is:

1. A method for increasing dissolution efficiency in a process wherein a feed fluid including at least a first component and a second component is introduced to a zone where said fluid is contacted with a liquid solvent for effecting preferential dissolution of the first component and wherein part of said liquid solvent undergoes transfer into said fluid upon contact therewith to effect saturation of said fluid, said method comprising:
incorporating in said fluid to be so contacted in said zone, an amount of said solvent sufficient to at least saturate said fluid under the conditions prevailing in said zone.

2. The method of claim 1 wherein said feed fluid is a liquid and wherein said amount of said solvent is is present therein as a liquid.

3. The method of claim 1 wherein said feed fluid is a gas and wherein said amount of said solvent is present therein as a gas.

4. A method for increasing absorption efficiency in a process wherein a feed gas including at least a first gaseous component and a second gaseous component is introduced to a zone where said gas is contacted with a liquid solvent for effecting preferential absorption of the first component and wherein part of said liquid solvent undergoes vaporization on contact with said gas to effect saturation of said gas, said method comprising:
  incorporating in the gas to be so contacted in said zone, sufficient of said solvent in the gas phase to at least saturate said gas under the conditions prevailing in said zone.

5. In the processing of a feed gas to recover a selected component thereof said gas including at least a first gaseous component, a second gaseous component, and vapor of a selected solvent, the concentration of said vapor in said gas being less than the concentration required to saturate the same, said gas being introduced to an absorption zone where it is contacted with the selected solvent in the liquid phase to effect preferential absorption of the first component, the improvement comprising:
  promoting said absorption by adding sufficient vapor of said solvent to the gas to be so contacted to at least saturate said gas therewith under the conditions prevailing in said zone.

6. In a continuous process wherein a stream of gas including at least a first gaseous component and a second gaseous component is mixed with a gas-recycle stream to form a stream of feed gas, said recycle stream containing vapor of a selected solvent in an amount insufficient to saturate said feed gas, said feed gas being introduced to a zone where it is contacted with said selected solvent in the liquid phase to effect preferential absorption of the first component, the improvement comprising:
  promoting said absorption by incorporating additional vapor of said solvent in said feed gas in an amount at least saturating said feed gas under the conditions prevailing in said zone.

7. A method for increasing dissolution efficiency in a process wherein a liquid feed including at least a first component and a second component is introduced to a zone where said feed is contacted with a liquid solvent for effecting preferential dissolution of the first component and wherein part of the liquid solvent undergoes transfer into said feed upon contact therewith to effect saturation of the same, said method comprising:
  incorporating in said feed introduced to said zone an amount of said solvent in the liquid phase sufficient to at least saturate said feed under the conditions prevailing in said zone.

8. In a process for recovering a selected component of a feed gas as a product, the steps of:
  introducing a feed gas including at least a first component and a second component to a zone where the feed fluid is contacted with a liquid solvent for effecting preferential dissolution of the first component, the feed gas to be contacted being at least saturated with vapor of said solvent under the conditions prevailing in said zone, and
  separately withdrawing from said zone undissolved feed gas containing the second component, and liquid solvent enriched in the first component.

9. The process of claim 8 wherein said feed gas to be so contacted is supersaturated with vapor of said solvent.

10. In a process for recovering a selected component of a feed liquid as a product, the steps of:
  introducing a feed liquid including at least a first component and a second component to a zone where the feed liquid is contacted with a liquid solvent for effecting preferential dissolution of the first component, the feed liquid to be so contacted being at least saturated with said solvent as a liquid under the conditions prevailing in said zone, and
  separately withdrawing from said zone undissolved feed liquid containing said second component, and liquid solvent enriched in the first component.

11. The process of claim 10 wherein said feed liquid to be so contacted is supersaturated with said solvent as a liquid.

* * * * *